United States Patent
Lam et al.

(10) Patent No.: US 6,519,674 B1
(45) Date of Patent: Feb. 11, 2003

(54) CONFIGURATION BITS LAYOUT

(75) Inventors: Peter Shing Fai Lam, Santa Clara; Dani Dakhil, Campbell; Jin-sheng Shyr, Cupertino, all of CA (US)

(73) Assignee: Chameleon Systems, Inc., Sunnyvale, CA (US)

( * ) Notice: Subject to any disclaimer, the term of this patent is extended or adjusted under 35 U.S.C. 154(b) by 0 days.

(21) Appl. No.: 09/507,337

(22) Filed: Feb. 18, 2000

(51) Int. Cl.[7] .............................................. G06F 12/00
(52) U.S. Cl. ......................................... 711/103; 326/38
(58) Field of Search ............................. 711/103; 326/38

(56) References Cited

U.S. PATENT DOCUMENTS

| | | | |
|---|---|---|---|
| 5,430,687 A | | 7/1995 | Hung et al. |
| 5,457,408 A | * | 10/1995 | Leung ........................ 326/38 |
| 5,493,239 A | | 2/1996 | Zlotnick |
| 5,705,938 A | * | 1/1998 | Kean .......................... 326/39 |
| 5,732,246 A | | 3/1998 | Gould et al. |
| 5,802,003 A | | 9/1998 | Iadanza et al. |
| 5,821,772 A | * | 10/1998 | Ong et al. .................... 326/38 |
| 5,910,732 A | * | 6/1999 | Trimberger ................... 326/38 |
| 6,020,758 A | * | 2/2000 | Patel et al. ................... 326/40 |
| 6,037,800 A | * | 3/2000 | Trimberger ................... 326/38 |
| 6,172,520 B1 | * | 1/2001 | Lawman et al. ............... 326/38 |
| 6,172,521 B1 | * | 1/2001 | Motomura ................... 326/40 |
| 6,204,687 B1 | * | 3/2001 | Schultz et al. ................ 326/40 |
| 6,222,757 B1 | * | 4/2001 | Rau et al. .................... 365/154 |
| 6,255,848 B1 | * | 7/2001 | Schultz et al. ................ 326/41 |
| 6,262,596 B1 | * | 7/2001 | Schultz et al. ................ 326/41 |

* cited by examiner

Primary Examiner—Kevin Verbrugge
(74) Attorney, Agent, or Firm—Thelen Reid & Priest LLP; Robert E. Krebs

(57) ABSTRACT

A configuration bit layout for a reconfigurable chip includes address bits stored along with configuration bits. The blocks of data are loaded onto the reconfigurable chip from an external memory and the address information is decoded to load the configuration bits onto the correct locations in the reconfigurable chip. In this way, configuration data need not be stored sequentially in the external memory. Configurations can be allocated into different slices of the reconfigurable chip as well.

22 Claims, 12 Drawing Sheets

| Address | Data | |
|---|---|---|
| | 1:15 | 32:31 0 |
| 0x0 | DPU/MULT Registers | row0 register A |
| 0x1 | | row0 register B |
| 0x2 | | row0 register O |
| 0x3 | | |
| 0x4 | | row1 register A |
| 0x5 | | row1 register B |
| 0x6 | | row1 register O |
| 0x7 | | |
| * | RESERVED | |
| * | | |
| 0x88 | | row31 High mult register A |
| 0x89 | | row31 High mult register B |
| 0x8A | | row31 High mult register O |
| 0x8B | | |
| 0x8C | | row31 Low mult register A |
| 0x8D | | row31 Low mult register B |
| 0x8E | | row31 Low mult register O |
| 0x8F | | |
| | 1:15 | 87:86 58:57 29:28 0 |
| 0x90 | row 0 DPU config1 | row 0 DPU config0 |

*FIG. 6A-1*

| 0x91 | row 0 DPU config3 | | row 0 DPU config2 | |
| 0x92 | row 0 DPU config5 | | row 0 DPU config4 | |
| 0x93 | row 0 DPU config7 | | row 0 DPU config6 | |
| 0x94 | row 1 DPU config1 | | row 1 DPU config0 | |
| 0x95 | row 1 DPU config3 | | row 1 DPU config2 | |
| 0x96 | row 1 DPU config5 | | row 1 DPU config4 | |
| 0x97 | row 1 DPU config7 | | row 1 DPU config6 | |
| * | | | | |
| * | | | | |
| 0x10C | row31 MULT high config3 | row31 MULT high config2 | row31 MULT high config1 | row31 MULT high config0 |
| 0x10D | row31 MULT high config7 | row31 MULT high config6 | row31 MULT high config5 | row31 MULT high config4 |
| 0x10E | row31 MULT low config3 | row31 MULT low config2 | row31 MULT low config1 | row31 MULT low config0 |
| 0x10F | row31 MULT low config7 | row31 MULT low config6 | row31 MULT low config5 | row31 MULT low config4 |

DPU config Details

| 2:0 | muxasel |
| 5:3 | muxbsel |
| 6 | muxbfsel |
| 8:7 | muxafgsel |
| 13:9 | shiftamt |
| 14 | shiftdir |
| 22:15 | opcode |
| 23 | muxbcfsel |

*FIG. 6A-2*

| | |
|---|---|
| 24 | latapipe |
| 25 | latbpipe |
| 26 | latopipe |
| 28:27 | muxopasel |
| 30:29 | muxopbsel |
| 33:31 | shiftmode |
| 36:34 | conf |
| 37 | muxalulsmsel |
| 38 | muxoutsel |
| 39 | ctrl |
| 40 | lsm read/write enable (overlapped for both read and write enables, even row for read and odd row for write) |
| 44:41 | dpu continue |
| 57:45 | RESERVED |
| | MULT config. Details |
| 2:0 | muxasel |
| 5:3 | muxbsel |
| 6 | muxbfsel |

*FIG. 6A-3*

| | | |
|---|---|---|
| 8:7 | muxafgsel | |
| 10:9 | muxbcfsel | |
| 11 | muxafghsel | |
| 12 | muxopasel | |
| 13 | muxopbsel | |
| 14 | muxmultismsel | |
| 15 | muxoutsel | |
| 16 | latapipe | |
| 17 | latbpipe | |
| 18 | latopipe | |
| 19 | cditilepipe (this is the clock enable on a tile basis, only exist one per tile. Although space is reserved for both high and low CSMMULT, we only use the one from the high) | |
| 20 | lsm read/write enable (just like the editilepipe, we use the read enable for the 3rd lsm from the 6th dpu, write enable from the high multiplier) | |
| 24:21 | dpu continue (same here, only the one from the high multiplier is used) | |
| 28:25 | RESERVED | |
| | CONTROL CONFIG 48\|47 | 0 |
| 0x140 | 115 | Tile A PLA AND 10 |
| 0x141 | | Tile A PLA AND 11 |
| 0x142 | | Tile A PLA AND 12 |
| 0x143 | | Tile A PLA AND 13 |
| 0x144 | Tile A PLA OR 10 | Tile A PLA AND 14 |

*FIG. 6B-1*

| | |
|---|---|
| 0x145 | Tile A PLA OR 11 |
| 0x146 | Tile A PLA OR 12 |
| 0x147 | Tile A PLA OR 13 |
| 0x148 | Tile A PLA OR 14 |
| 0x149 | Tile A Tile Basis Control |
| 0x14A | Tile A Row Basis Control 11 |
| 0x14B | Tile A Row Basis Control 12 |
| * | |
| * | |
| 0x170 | Tile D PLA AND 10 |
| 0x171 | Tile D PLA AND 11 |
| 0x172 | Tile D PLA AND 12 |
| 0x173 | Tile D PLA AND 13 |
| 0x174 | Tile D PLA OR 10 / Tile D PLA AND 14 |
| 0x175 | Tile D PLA OR 11 |
| 0x176 | Tile D PLA OR 12 |
| 0x177 | Tile D PLA OR 13 |
| 0x178 | Tile D PLA OR 14 |
| 0x179 | Tile D Tile Basis Control |
| 0x17A | Tile D Row Basis Control 11 |
| 0x17B | Tile D Row Basis Control 12 |

Tile Basis Control Details

*FIG. 6B-2*

| | |
|---|---|
| 1:0 | SRBDMA: muxdmasetsel |
| 25:2 | GNET: hortnetsel: {net5,net4,...,net0} |
| 34:26 | GNET: vertnetsel: {net2,net1,net0} |
| 40:35 | GNET: hortnettrien: {en5,en4,...,en0} |
| 52:41 | LSM: rmode {lsm3,lsm2,lsm1,lsm0} |
| 64:53 | LSM: wmode {lsm3,lsm2,lsm1,lsm0} |
| 72:65 | LSMNET: raddr {transen3to4,trien3,transen2to3,trien2,transen1to2,trien1,transen0to1,trien0} |
| 80:73 | LSMNET: rdata {transen3to4,trien3,transen2to3,trien2,transen1to2,trien1,transen0to1,trien0} |
| 88:81 | LSMNET: waddr {transen3to4,trien3,transen2to3,trien2,transen1to2,trien1,transen0to1,trien0} |
| 96:89 | LSMNET: wdata {transen3to4,trien3,transen2to3,trien2,transen1to2,trien1,transen0to1,trien0} |
| | Row Basis Control Details |
| 11[3:0] | row3-0: SRBR clken |
| 11[15:4] | row3-0: SRBR csmaddrmask |
| 11[19:16] | row3-0: SRBR vstatemuxsel |
| 11[23:20] | row3-0: SRBR vstatetrien |
| 11[27:24] | row3-0: SRBR hstatetrien |
| 11[39:28] | row3-0: SRBR muxslowbitsel |
| 11[43:40] | row3-0: SRBR muxfastbitsel |
| 11[47:44] | row3-0: SRBR hbittrien |
| 11[55:48] | row3-0: SRBR muxinterruptsetsel |
| 11[59:56] | row3-0: SRBR iregbittrien |
| 11[69:60] | row3-0: CSUINMAT nibble mux select (or pla input 7:0) |

FIG. 6B-3

| | |
|---|---|
| 11[89:70] | row3-0: CSUINMAT bitinmuxsel |
| 11[105:90] | row3-0: CSUINMAT bitmux |
| 12[3:0] | row7-0: SRBR clken |
| 12[15:4] | row7-4: SRBR csmaddrmask |
| 12[19:16] | row7-4: SRBR vstatemuxsel |
| 12[23:20] | row7-4: SRBR vstatetrien |
| 12[27:24] | row7-4: SRBR hstatetrien |
| 12[39:28] | row7-4: SRBR muxslowbitsel |
| 12[43:40] | row7-4: SRBR muxfastbitsel |
| 12[47:44] | row7-4: SRBR hbittrien |
| 12[55:48] | row7-4: SRBR muxinterruptsetsel |
| 12[59:56] | row7-4: SRBR iregbittrien |
| 12[69:60] | row7-4: CSUINMAT nibble mux select (or pla input 7:0) |
| 12[89:70] | row7-4: CSUINMAT bitinmuxsel |
| 12[105:90] | row7-4: CSUINMAT bitmux |

| | LSM BANK | 27 | 26 | 0 |
|---|---|---|---|---|
| 115 | | | lsmbank | |

LSM BANK Details

| 0x180 | RESERVED |
|---|---|
| 26 | operand 2 valid |
| 25 | operand 1 valid |
| 24 | operand 0 vaild |
| 23:20 | lsm count 3 |

FIG. 6C-1

| 19:16 | lsm index 2 |
| 15:12 | lsm count 1 |
| 11:8 | lsm index 1 |
| 7:4 | lsm count 0 |
| 3:0 | lsm index 0 |

*FIG. 6C-2*

CONFIGURATION BITS LAYOUT

BACKGROUND OF THE INVENTION

1. Field of the Invention

The present invention relates to reconfigurable computing systems.

2. State of the Art

As the cost of complex integrated circuits continues to fall, systems companies are increasingly embedding reduced instruction set computer (RISC) processors into non-computer systems. As a result, whereas the bulk of development work used to be in hardware design, now it is in software design. Today, whole applications, such as modems, digital video decompression, and digital telephony, can be done in software if a sufficiently high-performance processor is used. Software development offers greater flexibility and faster time-to-market, helping to offset the decrease in life cycle of today's electronic products. Unfortunately, software is much slower than hardware, and as a result requires very expensive, high-end processors to meet the computational requirements of some of these applications. Field Programmable Gate Arrays (FPGAs) are also increasingly used because they offer greater flexibility and shorter development cycles than traditional Application Specific Integrated Circuits (ASICs), while providing most of the performance advantages of a dedicated hardware solution. For this reason, companies providing field programmable or embedded processor solutions have been growing very rapidly.

It is desired to have an improved method and apparatus for reconfigurable computing.

SUMMARY OF THE PRESENT INVENTION

The present invention comprises placing address information along with configuration bits in blocks of data stored in an external memory. A reconfigurable chip uses the address data in the blocks to aide in the loading of the configuration bits in the correct locations of the reconfigurable logic.

Since address information is stored in the blocks, the blocks of configuration data stored in the external memory need not be stored in sequence. In prior art configurable systems, an entire configuration is typically loaded from the external memory in sequence, so that the correct loading of configuration data is maintained. The disadvantage of this prior art arrangement is that the entire sequence of configuration data stored in the external memory is relatively large, causing the loading time to be relatively large as well.

The arrangement of the present invention allows for less than all the configuration data to be stored in a downloaded group of the configuration blocks. Each block of data can be independently loaded. The address in the block of data is decoded to provide the reconfigurable chip address for storing the configuration bits. The position of a configuration bit block in the external memory is independent of the reconfigurable chip address stored in the block. This is an advantage in reconfigurable computing environments which use many partial loads of the reconfigurable chip with configuration data. The download time is reduced because not all of the configuration data needs to be downloaded from the external memory at one time.

In a preferred embodiment, each block comprises a line of data. The line of data is preferably sized to fit an internal bus of the reconfigurable chip. The configuration data can be for both the data paths and control path of the reconfigurable logic.

In a preferred embodiment, the loading of the configuration bits, is done using an address decoder to produce select lines. Each select line loads a number of memory elements with one of the configuration bits. There is preferably a configuration bit line is for each of the configuration bits in a block of configuration data. In one embodiment, there is a single such decoder and configuration bit line arrangement. Alternately, a decoder and configuration lines can be used for each of the slices used in the reconfigurable logic chip. The address in the block of configuration data can be an offset address from a base address. If multiple slices are used, a configuration allocation system can allocate the configurations to the correct slice.

BRIEF DESCRIPTION OF THE DRAWINGS

FIGS. 6A–6C are diagrams of the configuration bit system of one embodiment of the present invention.

DETAILED DESCRIPTION OF THE PREFERRED EMBODIMENT

Figure 1:
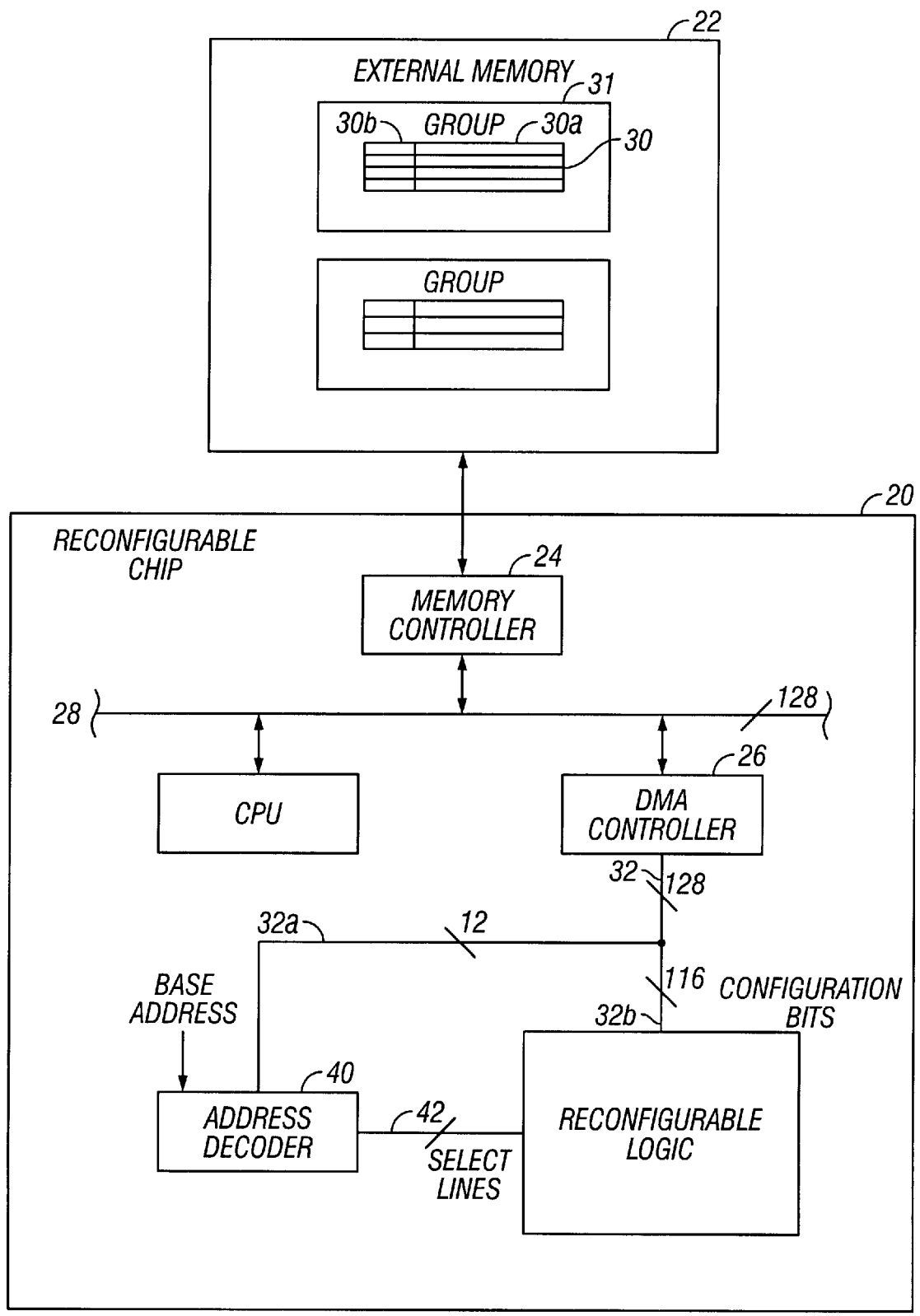
FIG. 1 is a diagram illustrating an overview of a reconfigurable chip including the system of the present invention.

FIG. 1 is a diagram illustrating a reconfigurable chip 20 of the present invention. Reconfigurable chip 20 is connected to an external memory 22. Data from external memory 22 is loaded into the reconfigurable chip 20 using the memory control 24 and Data Memory Access (DMA) controller 26. The data is sent across an internal bus 28. In a preferred embodiment, the external memory stores blocks 30 of data combined into a group 31. Each block of data includes configuration bits 30a and address bits 30b. A group of blocks can store a downloadable configuration to implement a function for the reconfigurable computer. Configuration data blocks are sent to the memory controller across bus 28 to the data controller 26. The block is then sent to bus 32. The bus 32 splits into the address line 32a and the configuration bit lines 32b. The address lines 32a are sent to address decoder 40. The address decoder produces select lines 42 which are sent to the reconfigurable logic along with the configuration bits along lines 32b. Note that the address decoder 40 can also include a base offset address for the address decoder. The configuration bits on lines 32b are loaded into a row of configuration memory associated with the active select line. Details of this arrangement are shown below in FIGS. 2–4.

One embodiment of a reconfigurable chip for use with the present invention is disclosed in the patent application "An Integrated Processor And Programmable Data Path Chip For Reconfigurable Computing," Ser. No. 08/884,380, filed Jun. 27, 1998, now U.S. Pat. No. 5,970,254, incorporated herein by reference. Details of a control system which can be loaded using the system of the present invention is described in the patent application, "Control Fabric For Enabling Data Path Flow and CPU Operand Signal Mobility," Ser. No. 09/401,194 filed Sep. 23, 1999, now U.S. Pat. No. 6,349,346.

Figure 2:
FIG. 2 is a diagram illustrating an arrangement of one line of data.
Figure 3:
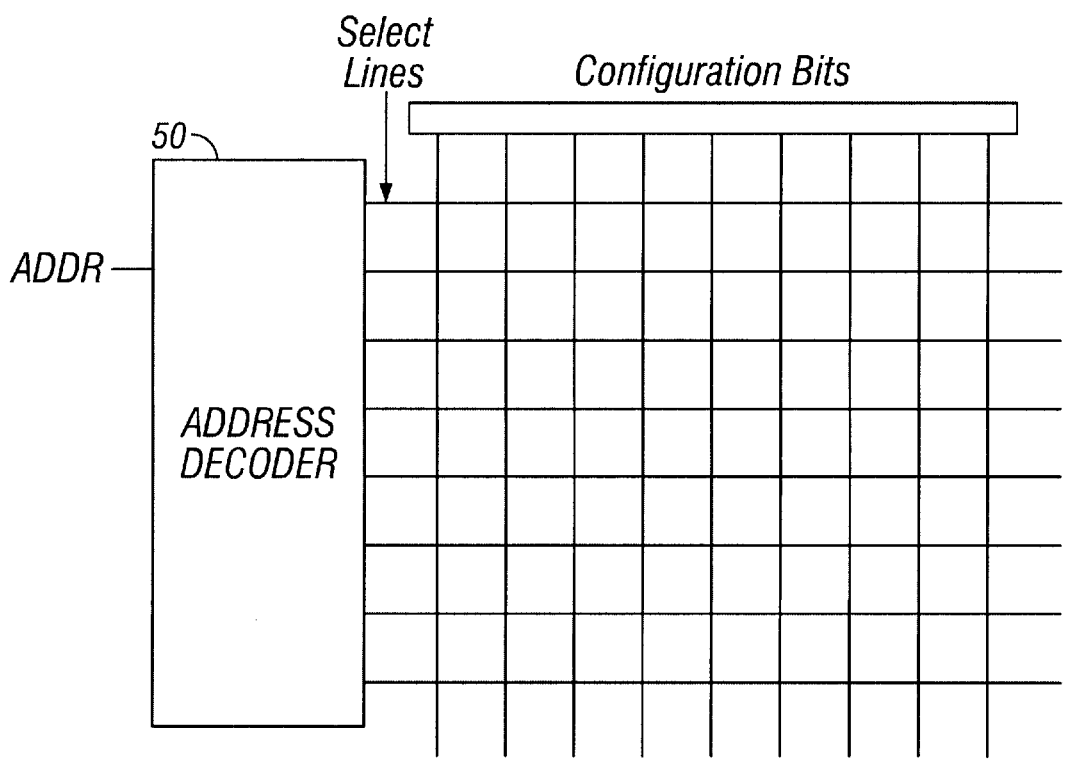
FIG. 3 is a diagram illustrating an address decoder used with the present invention.

FIG. 2 illustrates the data on the bus including twelve address bits and one hundred and sixteen configuration bits. FIG. 3 shows the address decoder 50 receiving the address bits. The configuration bits and select lines produced by the address decoder are both supplied to a number of memory elements that are used to store the configuration data for the system. Depending upon which select line is active, a row of memory elements are loaded with the configuration bits on the configuration bit lines.

Figure 4:
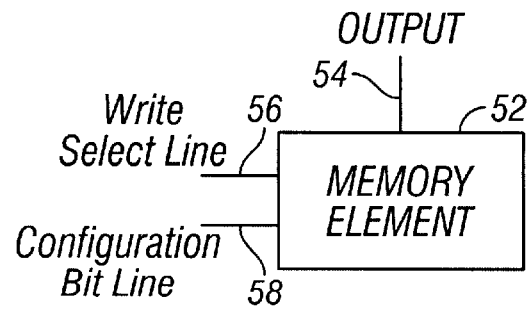
FIG. 4 is a diagram of a memory element that can be used with the present invention.

FIG. 4 illustrates a memory element 52 which can be located at the intersections of the select lines and configuration bits shown in FIG. 3. The memory element 52 produces a configuration bit output on line 54. The memory element also receives a write select line from the address decoder and a configuration bit line. When the write select line goes high, data on the configuration bit line is stored in the memory element 52.

Figure 5:
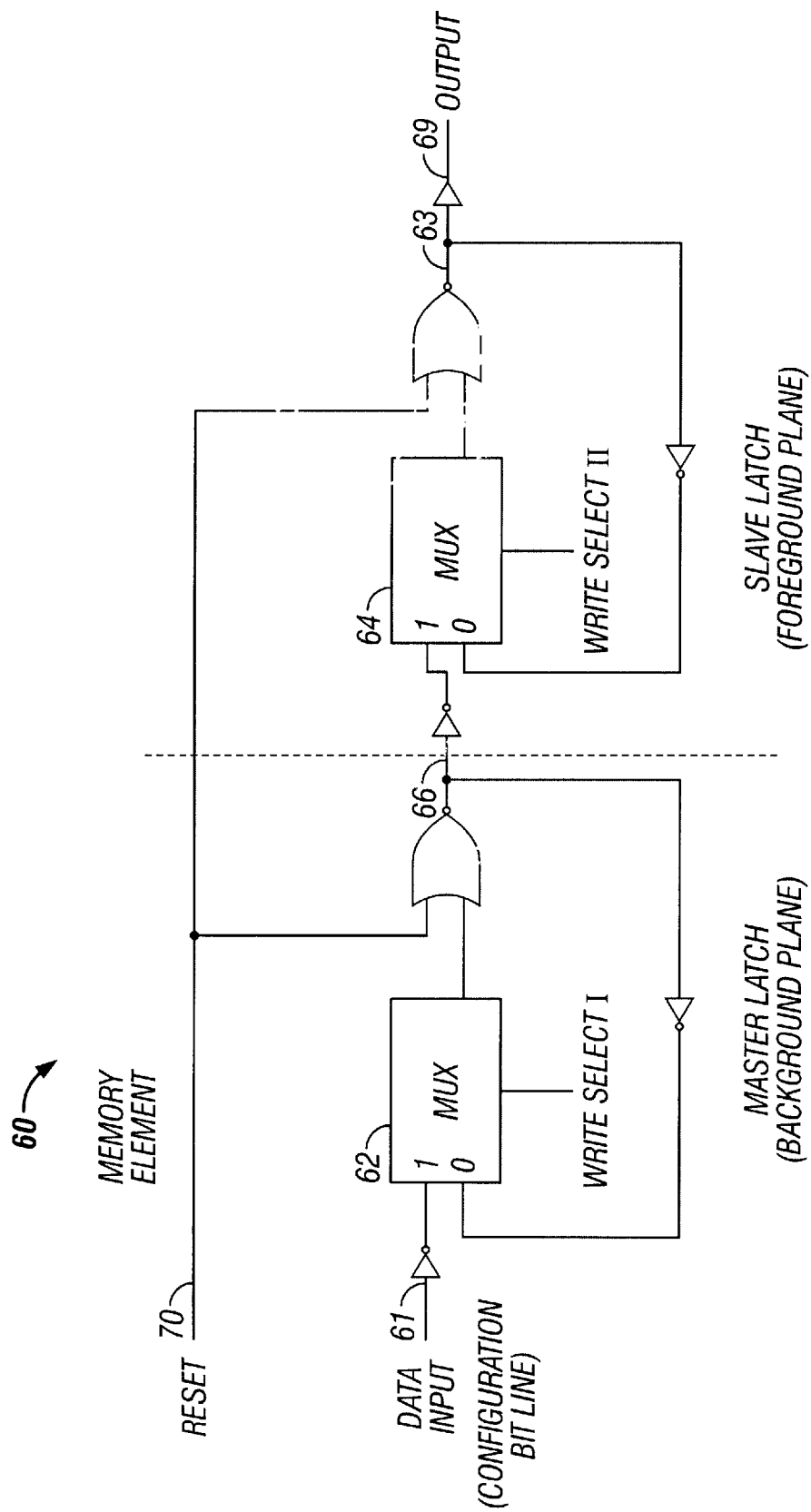
FIG. 5 is a detailed diagram of one embodiment of a memory element used with one embodiment of the present invention.

FIG. 5 illustrates an embodiment of a one type of memory element that can be used with the present invention. The memory element 60 includes a background plane latch and a foreground plane latch. Two different planes of configuration data are stored. During normal operation of the memory element, the nodes 63 and 66 store the foreground plane bit and the background plane bit respectively. When the write select line to multiplexer 62 goes high, data on the data input line 61 is written into the node 66. When the write select line to multiplexer 64 goes high, the value at node 66 is loaded into node 63. This causes the background plane to be loaded into the foreground plane. The reset line 70 can be used to reset the node 66 and 63 to zero.

Figure 7:
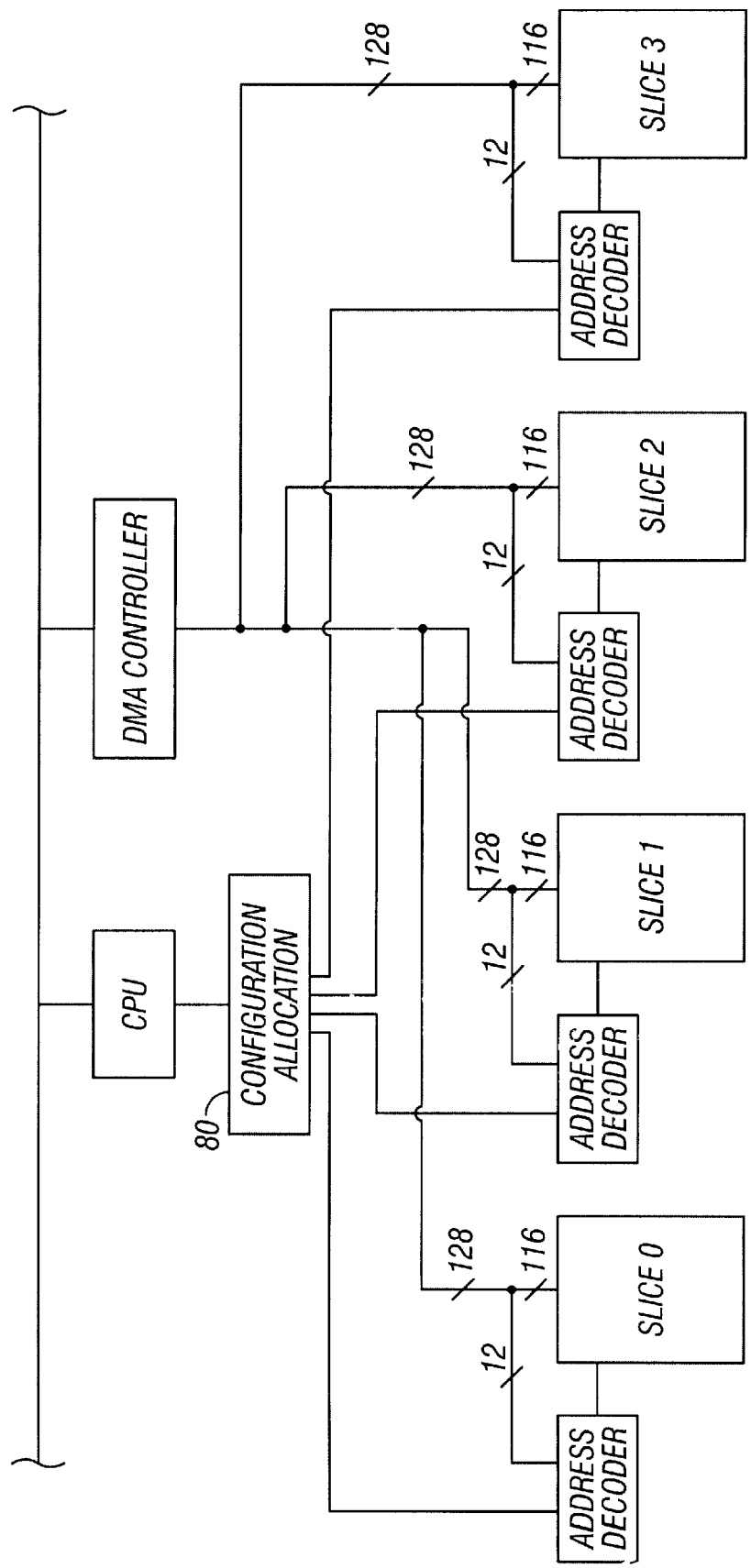
FIG. 7 is a diagram of one embodiment of the present invention using multiple address decoders in the embodiment in which the configuration can be allocated to different reconfigurable slices.

FIG. 7 illustrates an alternate embodiment of the present invention. In this alternate embodiment, multiple address decoders are used. A configuration allocation block 80 is used to produce signals to the address decoders to cause the loading of the configurations. In this embodiment, different functions configurations can be dynamically loaded into different slices of the reconfigurable logic. An example of this type of system is described in the patent application, "Configuration Loading And Slice Allocation," Ser. No. 09/507,344, which is incorporated herein by reference.

FIGS. 6A–6C illustrate an embodiment of the configuration data arrangement for one embodiment of the present invention. As described above not all of the lines of configuration data need to be stored in each downloaded group.

The advantage of the present invention is the address for part of the configuration data is stored along with the block including configuration bits. The full configuration need always be downloaded. Some configuration bits in a slice or the entire reconfigurable logic may need only to be zeroed which can be done by a reset signal. Alternately, for reconfigurable computing, only parts of the reconfigurable logic may need be written over with the configuration data during the active processing. Thus, to implement certain functions, not all the configuration bits need to be loaded, and thus, not all the configuration bits need to be stored in the external memory.

It will be appreciated by those of ordinary skill in the art that the invention can be implemented in other specific forms without departing from the spirit or character thereof. The presently disclosed embodiments are therefore considered in all respects to be illustrative and not restrictive. The scope of the invention is illustrated by the appended claims rather than the foregoing description, and all changes with come within the meaning and range for equivalent thereof are intended to be embraced herein.

We claim:

1. A method of loading a reconfigurable chip from on an off-chip memory, the method comprising:
   storing blocks of configuration data in an off-chip memory, each block containing configuration bits and a reconfigurable chip address for the configuration bits;
   loading at least one block onto the reconfigurable chip; and
   using the reconfigurable chip address to store the configuration bits onto the reconfigurable chip.

2. The method of claim 1, wherein a block comprises a line of the data.

3. The method of claim 2, wherein the line comprises 128 bits.

4. The method of claim 1, wherein the blocks are sized to fit on an internal bus of the reconfigurable chip.

5. The method of claim 1, wherein a group of data is less than a full configuration for the reconfigurable chip.

6. The method of claim 1, wherein groups of blocks are loaded into the reconfigurable logic chip.

7. The method of claim 1, wherein blocks of data in external memory are not sequentially stored.

8. The method of claim 1, wherein the address stored in a block is an offset address.

9. The method of claim 1, wherein the location of a block in the external memory does not indicate the reconfigurable address in the reconfigurable logic chip.

10. A reconfigurable system comprising:
    an external memory containing blocks of configuration data, each block containing configuration bits and a reconfigurable chip address for the configuration bits;
    a reconfigurable chip adapted to be loaded from the external memory, the reconfigurable chip adapted to use the reconfigurable chip address to store the configuration bits.

11. The reconfigurable logic chip of claim 10, wherein the block comprises of a line of data.

12. The reconfigurable logic chip of claim 11, wherein the line comprises 128 bits of data.

13. The reconfigurable logic chip of claim 10, wherein the blocks are sized to fit on an internal bus of the reconfigurable chip.

14. The apparatus in claim 10, further comprising an address decoder on the reconfigurable chip, the address decoder being given the address from a block in order to produce select lines for the configuration memory on the reconfigurable chip.

15. The reconfigurable chip of claim 10, wherein the group of data loaded from off-chip is less than a full configuration.

16. The reconfigurable chip of claim 10, wherein the address stored in each block is an offset address.

17. A method of loading a reconfigurable chip from on an off-chip memory, the method comprising:
    storing groups of blocks of configuration data in an off-chip memory, each block containing configuration bits and a reconfigurable chip address for the configuration bits, at least one group not containing a full configuration of the reconfigurable chip;
    loading a group of blocks onto the reconfigurable chip; and
    using the reconfigurable chip address stored in the blocks to store the configuration bits onto the reconfigurable chip.

18. The method of claim 17, wherein the address of the block of data in the external memory does not indicate the address on the reconfigurable chip.

19. The method of claim 17, wherein the block of data comprises a line of data.

20. The method of claim 19, wherein the line comprises 128 bits of data.

21. The method of claim 17, wherein a block of data comprises data to be fit upon the internal bus.

22. The method of claim 17, wherein the address is an offset address.

\* \* \* \* \*

UNITED STATES PATENT AND TRADEMARK OFFICE
CERTIFICATE OF CORRECTION

PATENT NO.    : 6,519,674 B1
DATED         : February 11, 2003
INVENTOR(S)   : Lam et al.

It is certified that error appears in the above-identified patent and that said Letters Patent is hereby corrected as shown below:

Column 3,
Line 53, insert -- not --.

Signed and Sealed this

Third Day of August, 2004

JON W. DUDAS
*Acting Director of the United States Patent and Trademark Office*